(12) United States Patent
Trell

(10) Patent No.: US 6,606,376 B1
(45) Date of Patent: Aug. 12, 2003

(54) METHOD FOR ENTRANCE TELEPHONE COMMUNICATION UTILIZING PUBLIC SUBCRIBER TELEPHONE NETWORKS

(75) Inventor: Anders Edvard Trell, Stockholm (SE)

(73) Assignee: Anders Trell Trust, Buffalo, NY (US)

( * ) Notice: Subject to any disclaimer, the term of this patent is extended or adjusted under 35 U.S.C. 154(b) by 0 days.

(21) Appl. No.: 09/403,042

(22) PCT Filed: Feb. 17, 1999

(86) PCT No.: PCT/SE99/00212

§ 371 (c)(1),
(2), (4) Date: Oct. 25, 1999

(87) PCT Pub. No.: WO99/44353

PCT Pub. Date: Sep. 2, 1999

(30) Foreign Application Priority Data

Feb. 24, 1998 (SE) ............................................... 9800579
Jun. 16, 1998 (SE) ............................................... 9802147

(51) Int. Cl.[7] ............................................ H04M 11/00
(52) U.S. Cl. ................. 379/102.06; 379/14.13
(58) Field of Search ....................... 379/102.06, 167.05, 379/167.11, 102.01, 102.02, 114.13, 215.01, 114.21, 114.22, 114.23

(56) References Cited

U.S. PATENT DOCUMENTS

| | | | | |
|---|---|---|---|---|
| 3,816,662 A | * | 6/1974 | Shaver et al. ................. | 358/85 |
| 4,850,007 A | * | 7/1989 | Marino et al. ................ | 379/67 |
| 4,987,589 A | * | 1/1991 | Trell ......................... | 379/10.3 |
| 5,046,083 A | | 9/1991 | Trell ......................... | 379/93 |
| 5,153,907 A | * | 10/1992 | Pugh et al. .................. | 379/143 |
| 5,448,625 A | * | 9/1995 | Lederman .................... | 379/67 |
| 5,467,386 A | * | 11/1995 | Trell ......................... | 379/103 |
| 5,987,424 A | * | 11/1999 | Nakamura ................... | 705/14 |

FOREIGN PATENT DOCUMENTS

| | | | | |
|---|---|---|---|---|
| DE | 3400157 A | * | 7/1985 | ............ G08B/3/10 |
| DE | 19603095 | | 7/1997 | |
| FR | 2665041 | | 1/1992 | |
| SE | 451422 | | 10/1987 | |
| WO | WO 98/48607 | * | 11/1998 | |

* cited by examiner

Primary Examiner—Curtis Kuntz
Assistant Examiner—Lun-See Lao
(74) Attorney, Agent, or Firm—Jacobson Holman PLLC

(57) ABSTRACT

A method for entrance telephone communication utilizing public subscriber telephone networks, in which at least part of the subscribers connected to the entrance telephone system are arranged having a telecommunication subscription facilitating that the subscriber is billed for received and switched through entrance telephone calls, preferably with the charges shown in the conventional telephone bill and/or with at least the call charges paid by sponsor/advertiser. Calling operations from the entrance telephone set are performed with a prefix indicating call of the type "called party pays" with the entrance telephone set accepted for initiation of such calls. Alternatively, subscribers connected to the entrance telephone system are treated as "020-subscribers" with regard to call charges for calls from the entrance telephone set. In another embodiment, subscribers connected to the entrance telephone system are given a secondary telephone number for entrance telephone calls on which the call charges are debited for calls from the entrance telephone set. A still further embodiment a sponsor/advertiser is given an opportunity to pass on a message to visitors when calling, and to pay for this service at least the call charges. The call is preferably charged only after acceptance of the call from the called party, and with disconnection, preferably without any call charge, if the called party does not accept the call.

11 Claims, 3 Drawing Sheets

METHOD FOR ENTRANCE TELEPHONE COMMUNICATION UTILIZING PUBLIC SUBCRIBER TELEPHONE NETWORKS

BACKGROUND OF THE INVENTION

Field of the Invention

The present invention relates to a method for entrance telephone communication utilizing public subscriber telephone networks.

SE, B, 451 422 and U.S. Pat. No. 4 987 589, for example, disclose how a public telephone network can be used for communication and operation purposes in an entrance telephone system. According to a preferred embodiment, it is also disclosed how a called party while maintaining secrecy, may accept or reject communication. However, a disadvantage is that rejected as well as accepted communication always results in a call charge, which, despite low installation costs for the system, often makes owners of property choose alternative solutions. For example. in U.S.A. a system is marketed under the slogan "no telephone bill", which is based on more or less conventional internal switching. Tenants may also be psychologically opposed to the fact that visitors/calls increase the cost of rent, since costs for the entrance telephone system is divided and added to the rent by the landlord, which means that tenants having few visitors/calls "subsidize"tenants having a large number of visitors/calls, e.g. doctors, dentists, and others having a high frequency of visitors. Coin or card operated entrance telephones have also been proposed; and all of the above indicates a major problem, and it is the object of the present invention to solve this problem.

SUMMARY OF THE INVENTION

The object of the present invention is to facilitate that call charges are divided more correctly, alternatively that call charges are eliminated/reduced (however, tenants may advantageously by means of the rent accept part of the fixed costs, since there are common functions; e.g. code lock is normally included), without imposing a complicated and more expensive administration for the landlord, for example by introducing a transaction memory, arranged to facilitate individual charging of the tenants. A further object of the present invention is to make it possible for tenants that permanently or temporarily wish to avoid entrance calls to completely avoid such calls by means of a programming operation and thus the non-fixed costs for entrance call charges, and with a totally protected integrity for all connected subscribers.

The method according to the present invention for entrance telephone communication utilizing public subscriber telephone networks is mainly characterized in that at least part of the subscribers connected to an entrance telephone system are arranged having a telecommunication subscription, or that the entrance telephone is arranged/connected in such a way, that the subscriber, or alternatively a sponsor/advertiser, is billed for received and switched through entrance telephone calls, preferably with the charges shown in the conventional telephone bill. According to the invention calls are preferably switched through and charged only after acceptance of the call from the called party, e.g. by dialling the digit "1", and with disconnection, preferably without any call charge, if the called party does not accept the call, e.g. by dialling the digit "2".

DESCRIPTION OF THE DRAWINGS

A non-restricting example of an embodiment according to the method of the present invention is more fully described below with reference to the accompanying drawings, in which.

DESCRIPTION OF THE INVENTION

The example of an embodiment will be described based on the system used in Sweden today for "called party pays"when calls are made from payphones owned by the Swedish Telecom Authority (TELIA). In this system, a calling party may by initially dialling "2#" obtain verbal instructions from a speech answering machine for the connection, according to which the telephone number (including any possible area code) of the called party first is dialled, whereafter the calling party clearly and distinctly says his name. The speech answering machine now automatically calls the desired party, who may accept the call by answering "yes" or alternatively depress "1" on the telephone. Should the called party answer "no" or depress "2" on his telephone, the call is disconnected. Should the call not be accepted, there is no charge, otherwise the call is charged on the telephone bill of the called party. This type of calls in Sweden do presently not facilitate calls to other countries, mobile telephones or 071-numbers. A similar system exists in the United States of America for ordinary private subscribers, entitled 1-800-COLLECT, operating in a similar manner, but presently only available for "long distance calls".

Based on the system discussed above, which in the following description is used as an example of a reference model, a building having an entrance telephone installation using the method according to the present invention can be briefly described as follows.

In such a system, all subscribers connected to the entrance telephone system, or only certain subscribers having a large number of calls (in which case remaining subscribers can be handled in a previously known fashion), can be reached from the entrance telephone via calls charged to the called party ("called party pays"), for example by allowing these programmed numbers to be initiated with a relevant prefix, e.g. "2#" or "1-800-COLLECT" as mentioned above. Such a function can also be arranged time operated, i.e. by treating entrance telephone calls during low traffic intensity periods (when call charges normally are lower) in a previously known way.

Figure 1:
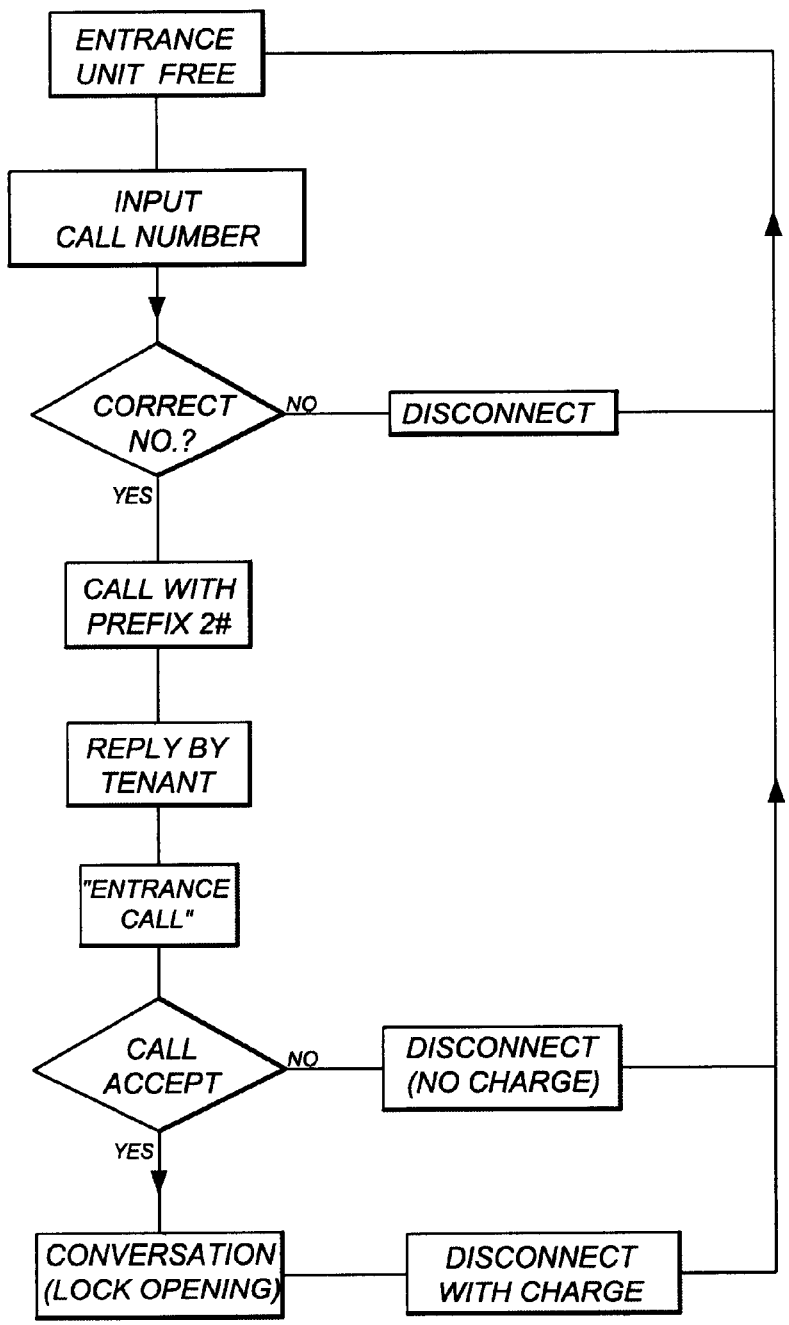
FIG. 1 is a block diagram showing an example of an embodiment of the method according to the invention.

With reference to the example of an embodiment shown in FIG. 1, an entrance telephone call is performed by a visitor in a conventional way by inputting the call number of the party to be called. As a following step, the inputted call number is advantageously checked with regard to validity, whereas an incorrectly inputted number does not initiate a call, i.e. the entrance telephone set becomes available for renewed input. The calling party may advantageously receive information of this fact, for example by means of a prerecorded verbal message. Should checking of the inputted number result in acceptance of same, a calling operation is performed. The prefix ("2#" according to used reference) which should precede a subscriber number is preferably preprogrammed and thus dialled automatically. However, connection thereafter of previously mentioned speech answering machine is not required, since it is acceptable if the called party receives a generical message, e.g. "Entrance call" or any similar message. The called party may now choose to accept the call (e.g. by depressing "1" or by answering "yes") or not to accept the call (e.g. by depressing "2" or by answering "no", or obviously in the case of "code ringing", number-ID etc. not lift the hand set at all), whereby disconnection is performed, without causing any call charge.

In the first mentioned case, the call is switched through to the called party, who can speak to the person initiating the call, and also preferably by inputting a suitable sequence, e.g. "1#", perform opening of the door lock. When the called party terminates the call, the call is charged when disconnection takes place.

However, the entrance telephone can advantageously be arranged to request information relating to the name of the visitor, before a connection is established, and such information relating to the name can thereafter be transferred to the called party. The called party can thereafter either refuse through connection in previously described fashion and while maintaining full secrecy, thus resulting in no call charge, or accept the call, whereby the called party apart from talking to the calling party also can perform entrance door opening, and the call charge is charged to the telephone bill of the called party. This method has the "inherent" advantage that the tenant has a better base for deciding whether the call should be accepted or secretly refused.

Figure 2:
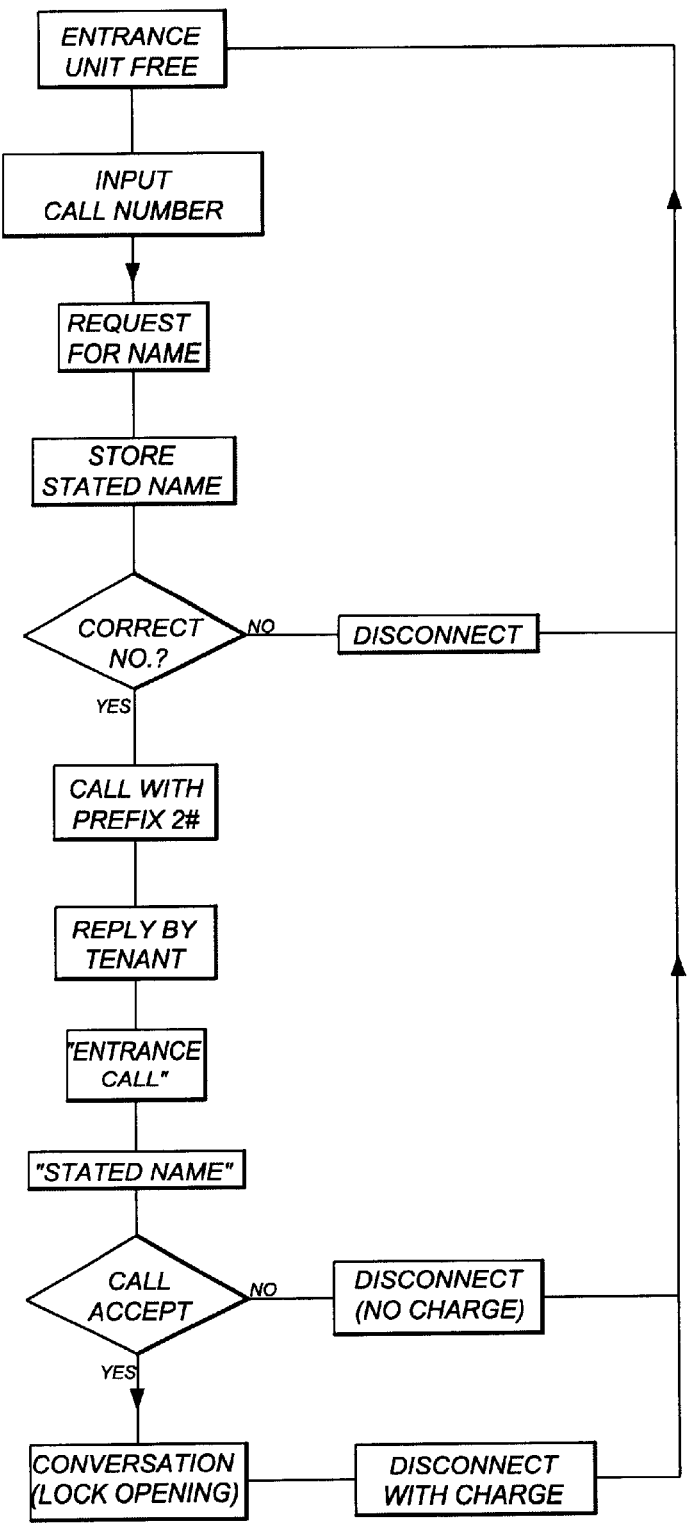
FIG. 2 is a block diagram corresponding to FIG. 1, showing a slightly modified example of an embodiment according to the invention.

Such a slightly modified embodiment of the example of a method described with reference to FIG. 1 is shown in FIG. 2, which includes communication of information relating to the name of a visitor. When the call number has been inputted, the calling party receives a verbal message requesting information of the name, and the reply given is stored. Following sequences correspond to the example of an embodiment described with reference to FIG. 1, apart from the fact that the called party does not only receive the message that the call is an entrance call, but also information relating to the name stated by the calling party.

Figure 3:
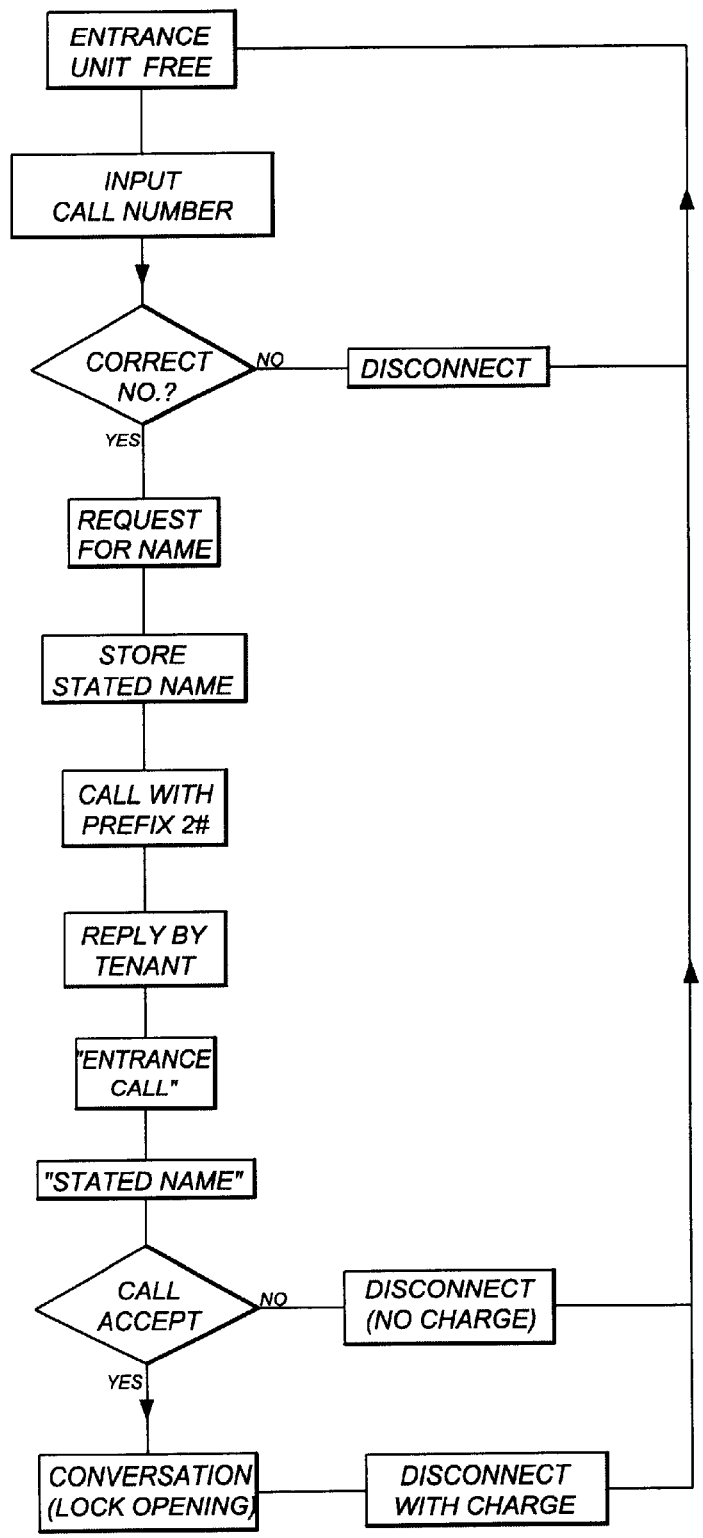
FIG. 3 is a block diagram corresponding to FIG. 2, showing a slightly modified order of steps for an entrance call.

In the block diagram according to FIG. 2, request and storage of the name of the calling party is performed prior to verification of inputted number, but such a verification can obviously be performed as an earlier step, i.e. in order to avoid storage of name information when a nonacceptable number has been inputted. Such a modified example of an embodiment in relation to FIG. 2 is shown in FIG. 3.

The basic examples of embodiments disclosed above may obviously be further modified in a number of ways, for example today existing systems of the type "called party pays" may be used without major modifications of existing entrance telephone installation utilizing public subscriber telephone networks, e.g. a calling party may as an initial operation input "2#" (in accordance with the reference model used) or as an initial step depress a call button, programmed to initiate dialling with use of this number sequence. When the calling party thereafter is requested to submit information relating to number/name, a call number can be dialled (which is not required to be a telephone number, since it can be translated into a telephone number submitted to number dialling equipment associated with the entrance apparatus). The disadvantage of such a simpler solution is that the called party can not distinguish between an entrance call and a call of the type "called party pays" from a payphone. When advertising/sponsoring is used, a message may replace this often real ringing tone for a visitor, but same is interrupted when B-reply occurs.

The charges for accepted entrance telephone calls can obviously also be charged to the subscription for the entrance telephone and later be divided on the tenants via the rent. With relatively low charges for the service "called party pays", such a solution may also be a better alternative than today's solution, resulting in call charges for every call switched through, also in the case when the called party does not accept the entrance telephone call. Such nonaccepted calls do not result in any call charges with the method according to the invention.

If and when mobile telephones and similar also include the service "called party pays", the method according to the present invention also offers the advantage that they can be programmed as reply sets in an entrance telephone system. This is normally not accepted. today, since the call charges for entrance telephone calls would become excessively high in an apartment building. However, mobile telephones become increasingly more common, and constitute today often the only telephone subscription. However, according to the present invention mobile telephones can be accepted connected to an entrance telephone system, since the costs for entrance telephone calls also in such a case would be charged to the owner of such a telephone.

What has herein been disclosed can thus be utilized if agreement relating to a suitable form of subscription can be reached with related telecommunication authority, sponsor/advertiser etc., and only requiring software modification of the telephone exchange to which the telephone line of the entrance telephone system is connected. For example, in those cases where the entrance set does not facilitate the phases A and B mentioned later, same can be provided by the central exchange by means of programs in the exchange. The tenants can also be given total individual freedom with regard to if, when and what type of service desired. The method according to the present invention can also advantageously be used in association with an entrance telephone system based on the disclosure of SE, B, 451 422, since preferred embodiments of said patent, including time monitored phases A and B, are well suited for use in accordance with the present invention, as more fully described below.

When addressing of the entrance set has been approved, same is checked in the programmed memory, which can be arranged programmable by the users, whether the number should be dialled conventionally or "collect", i.e. a type of call charged to the called party. Certain tenants, particularly smaller firms, may also have a direct line paid by themselves and in such a case this alternative is obviously chosen. Some tenants may have chosen to be non-programmed and are not dialled, possibly with a message. Calls of the type "collect", and with previously used reference, are initiated with "2#". The central exchange can thus distinguish such calls as calls of the type "called party pays"and debit same, possibly first after call acceptance "1". This is basically a question of policy for the telecommunication authority concerned and can easily be implemented in modem program operated central exchanges. A preferably verbal ID-signal is sent to the network during dialling (phase A). During this time, the visitor receives a real or simulated ring tone indication of audio and/or visual type, which, according to one embodiment of the invention, can be used by a sponsor/advertiser. When the called subscriber on reply by the ID-signal realizes that it is an entrance call, he can secretly chose to accept the call "1") or not to accept same "2") during the time period for phase A (the time period as from B-reply until action is taken until the call is charged can also possibly be restricted to, for example, 5 seconds). During the initial period (phase A) may as a further possibility the called party by means of a cable TV channel and a TV camera located by the entrance be offered possibility to see the calling party before making a choice of call acceptance, in which case, if a possible 5 seconds term is exceeded, the call is charged. Should the called party by inputting "1"accept the call, the call is switched through (phase B) and entrance conversation, and if desired, entrance door lock opening can thereafter be performed. The called party is now automatically billed for the entrance call via his phone bill. The charge can alternatively obviously be made to the subscription for the entrance telephone (to be divided later in a suitable fashion), in which case charges for nonaccepted calls are avoided.

A closely related modified solution to the use of "called party pays" is use of a subscription type somewhat similar to the existing "020-subscription" in Sweden, i.e. when a prefix "020") results in no call charge for a calling party in a telephone system. By allocating such a subscription status to the tenants with regard to calls made from the entrance telephone, entrance telephone calls can be separated from other conventional telephone calls, and result in charges debited on the telephone number of the called party.

A further modified solution for distinguishing entrance telephone calls from other incoming calls is to use a separate group of telephone numbers for tenants in a building, i.e. different from their normal telephone numbers. When entrance telephone calls occur directed to such a secondary telephone number, the central exchange can determine that the call in fact originates from the entrance telephone (and otherwise refuse switching through), and debit the call to the called party. Such debiting can alternatively occur on B-reply, or preferably first after that the called party has accepted the call.

A further modified solution intended to minimize or to avoid call charges for entrance calls is based the possibility to use the entrance telephone system to pass on an advertising message to the calling party. When an entrance call has been made, the visitor does not receive ring tones or similar, but instead an advertising message or similar is obtained, e.g. "ICA on the corner has this week an extra low price for tulips". With regard to systems having direct switching through operation, i.e. in which the called party does not have possibility during a first phase to refuse switching through, such a message can be transmitted during a first period of connection or prior to switching the call through to the called subscriber. The time period prior to switching the call through can also be adapted to the time period for the message, i.e. such that the call is switched through when only a few seconds remain of the message. The message can alternatively be transmitted from the central exchange or from the entrance telephone installation. In the latter case may said installation include an EEPROM or similar, which can be erased/reprogrammed via a called connection (utilizing the telecommunication circuit between the entrance telephone installation and the central exchange). This alternative would also work for subscriber numbers connected with a direct line. When the message is transmitted from the central exchange, which normally includes equipment for storage/transmission of verbal messages, inputted number can also advantageously be stored during a certain time period before being handled, thereby securing that substantially the entire message is transmitted before B-reply can occur. In installations comprising a first phase during which the called party has a possibility to refuse the call from being switched through, said time phase can be adapted to the actual length of the message, whereby advantageously the entire message is transmitted, regardless of whether or not disconnection or through switching is ordered by the called subscriber. Should the initial message be terminated prior to B-reply/acceptance, same may during the time frame of normal connection time be repeated, varied, complemented etc., possibly with information stating that connection is being established but reply has not yet been received, interrupted on B-reply/acceptance of the call or at the end of the connection period. A possibility to send advertisements/sponsor messages, without undue time being wasted for the actual entrance telephone communication purposes, also exist in at least two other well defined situations, namely when previously mentioned ID-signal is transmitted to the called party, it can include such a message, which is directed to and only reaching the called party. It can be interrupted when the call is accepted/rejected; and if and when lock opening occurs. The confirmation signal of completed opening operation may also include a shorter such message, which is directed/reaches both the calling and the called party, and which is interrupted by door opening/replaced hand set. In view of the difference between these two situations, the messages can be different. However, to include (directed two ways) advertisements during the actual speech period may cause irritation, and this is thus not preferred.

A company which in this way receives an advertising possibility accepts the charges for the entrance telephone calls, and since each call results in advertisements directed to at least one listener, far more efficient advertising is accomplished as compared to giving out leaflets or similar. Furthermore, the number of calls verifies how many persons are reached by the message (in certain cases will more than one person be reached by each individual message). This modified solution thus offers possibility to transfer the cost of entrance telephone calls to the advertising party, who, in certain cases, may be prepared to accept more than the call charges, i.e. to accept the costs for purchasing the installation or part thereof.

It is obviously possible for certain tenants to choose not to use the above described possibility to avoid costs for call charges, e.g. doctors, lawyers or other business owners that are tenants in the building. These persons may be charged in another manner, in parallel with the described embodiment, e.g. according to any of previously described methods.

Since the central exchange in all described embodiments also can determine that a call is an entrance call, this fact can, for example, be used to transmit a ring signal, or a "call waiting signal", of a type different from conventional signals, e.g. two short ring signals in replacement or a long ring signal.

If and when mobile telephones and similar also offer a service of the type "called party pays", "020-subscription", "advertisement-no charge-telephone" etc., the advantages of the present invention will be even greater. Mobile telephones of today are normally not allowed to be programmed into the acceptance memory of entrance telephones, since call charges would be to high in a tenant building. At the same time, mobile telephones are becoming more and more common, also the only telephone subscription for many persons. According to the invention mobile telephones can also be used as reply telephones, since they have to meet their higher call charges.

Described embodiments for utilization of the method according to the present invention are only intended to serve as examples, since certain modifications obviously may be necessary in order to adapt to the services that can be implemented or offered by a local telecommunication authority, or to the locations/telecommunication networks for which installations may occur, such as for example car parks; "extemal traffic" (e.g. "night connection") for companies having their own exchanges to which communication otherwise is routed; "POTS"-network; "electrical wiring telephone circuits"; ISDN/computer network telephone circuits; mobile (GSM) networks etc. to which the entrance telephone may be completely or partly mono- or polyconnected. The invention is thus in no way restricted to described embodiments, which can be varied, combined and modified within the scope of the inventive thought and the following claims.

What is claimed is:

1. A method for entrance telephone communication utilizing public subscriber telephone networks having a plurality of subscribers, the method comprising the steps of:

arranging at least part of the subscribers connected to an entrance telephone system having a telecommunication subscription, billing an advertiser for received and switched through entrance telephone calls, with charges shown in a conventional telephone bill, dialling from an entrance telephone set is performed with a prefix indicating a call of the type "called party pays" with the entrance telephone set accepted for initiation of such a call, and with the call being switched through and charged to said advertiser only after acceptance of the call from a called party, by dialling the digit "1", and with disconnection, without any call charge, if the called party does not accept the call, by dialling the digit "2", wherein the called party receives a verbal or any other identifiable message when replying to an entrance telephone call indicating that the call is an entrance telephone call, and information on the name stated by a visitor, and wherein the called party during a predetermined time period as from replying to an entrance telephone call is given possibility via a local cable TV network or similar to see the calling party by a TV camera adjacent to the entrance telephone set before accepting the call.

2. The method according to claim 1, wherein a central exchange is arranged to transmit at least ring or call waiting signals for calls from the entrance telephone set having different characteristics from conventional telephone calls.

3. The method according to claim 1, wherein said one or a number of tenants are connected to the entrance telephone system for connection via direct circuits from the entrance telephone set.

4. A method for entrance telephone communication utilizing public subscriber telephone networks having a plurality of subscribers, the method comprising the steps of:

arranging at least part of the subscribers connected to an entrance telephone system having a telecommunication subscription, billing an advertiser for received and switched through entrance telephone calls, with charges shown in a conventional telephone bill, treating at least part of the subscribers connected to the entrance telephone system as "020-subscribers", with the call charge debited on a recipient of the call for calls from the entrance telephone set, the call being switched through and charged to said advertiser only after acceptance of the call from the called party, by dialling "1", and with disconnection, without any call charge, if the called party does not accept the call, by dialling the digit "2", wherein the subscribers connected to the entrance telephone system are given a secondary telephone number for entrance telephone calls on which the call charges are debited for calls from the entrance telephone set, the call being switched through and charged to said advertiser only after acceptance of the call from the called party, by dialling "1", and with disconnection, without any call charge, if the called party does not accept the call, by dialling the digit "2", and wherein the called party receives a verbal or any other identifiable message when replying to an entrance telephone call indicating that the call is an entrance telephone call, and information of the name stated by a visitor.

5. The method according to claim 4, wherein a central exchange is arranged to transmit ring and/or call waiting signals for calls from the entrance telephone set having different characteristics from conventional telephone calls.

6. The method according to claim 4, wherein the called party during a predetermined time period as from replying to an entrance telephone call is given possibility via a local cable TV network or similar to see the calling party by means of a TV camera adjacent to the entrance telephone set before accepting the call.

7. The method according to claim 4, wherein said at least one tenant is connected to the entrance telephone system for connection via direct circuits from the entrance telephone set.

8. A method for entrance telephone communication utilizing public subscriber telephone networks having a plurality of subscribers, comprising the steps of:

arranging at least part of the plurality of subscribers connected to an entrance telephone system having a telecommunication subscription, in such a way, that an advertiser is billed for received and switched through entrance telephone calls, preferably with the charges shown in a conventional telephone bill, advantageously delaying calls directed to at least certain of the subscribers connected to the entrance telephone system which result in transmission of an advertising message or similar from the entrance telephone set when the call number has been inputted, through switching of the call to called subscriber during such a period of time that substantially the entire message is transmitted before B-reply can be accomplished, wherein the called party receives a verbal or any other identifiable message when replying to an entrance telephone call indicating that the call is an entrance telephone call, and information of the name stated by a visitor, and wherein the called party during a predetermined time period as from replying to an entrance telephone call is given possibility via a local cable TV network or similar to see the calling party by a TV camera adjacent to the entrance telephone set before accepting the call.

9. The method according to claim 8, and further comprising the step of:

adapting calls directed to at least some of the subscribers connected to the entrance telephone system result in transmission of the advertising message or similar from the entrance telephone set when the call number has been inputted, and that the length of the message to a first time period during which called subscriber can accept or refuse switching through of the call, the substantial part of the message being transmitted regardless of performed choice before the call is switched through or disconnected.

10. The method according to claim 8, wherein a central exchange is arranged to transmit ring and/or call waiting signals for calls from the entrance telephone set having different characteristics from conventional telephone calls.

11. The method according to claim 8, wherein said at least one tenant is connected to the entrance telephone system for connection via direct circuits from the entrance telephone set.

* * * * *